United States Patent [15] 3,700,212
Morgenberger [45] Oct. 24, 1972

[54] WHEEL DOLLY FOR LIFTING SNOWMOBILES AND THE LIKE

[72] Inventor: Peter C. Morgenberger, 2366 Spencerport Road, Spencerport, N.Y. 14559

[22] Filed: April 8, 1971

[21] Appl. No.: 132,297

[52] U.S. Cl. ............................................. 254/131
[51] Int. Cl. ................................................ B66f 3/00
[58] Field of Search ....... 254/8 R, 123, 120, 9 R, 131

[56] References Cited

UNITED STATES PATENTS

| | | | |
|---|---|---|---|
| 1,494,222 | 5/1924 | Dresser | 254/131 |
| 1,310,498 | 6/1919 | Leman | 254/9 R |

*Primary Examiner*—Robert C. Riordon
*Assistant Examiner*—Robert C. Watson
*Attorney*—Cumpston, Shaw & Stephens

[57] ABSTRACT

A wheel dolly for lifting an object such as a snowmobile or the like comprising a support bracket for rotatably supporting a lever to which a wheel is secured at one end. The lever is movable between a mounting position in which the bracket may be readily mountable on the object with facility, and a lifting position in which the bracket is releasably secured to the object and the object lifted above a reference or ground surface by the dolly. The lever is vertically adjustable to accommodate the height of the object above the ground surface, and to vary the vertical distance that the object is lifted.

12 Claims, 6 Drawing Figures

INVENTOR.
PETER C. MORGENBERGER
BY Cumpston, Shaw
and Stephens
ATTORNEYS

PATENTED OCT 24 1972

INVENTOR.
PETER C. MORGENBERGER
BY Cumpston, Shaw and Stephens
ATTORNEYS

WHEEL DOLLY FOR LIFTING SNOWMOBILES AND THE LIKE

BACKGROUND OF THE INVENTION

1. Field of the Invention

This invention relates generally to lifting mechanisms, and more specifically to a wheel dolly for lifting a snowmobile or the like.

2. Description of the Prior Art

The provision of a wheel dolly for lifting a heavy object and to facilitate moving such objects is well known in the art. Most wheel dollies that applicant is aware of are of relatively complicated construction, expensive to manufacture and difficult to operate or use. With the advent of the snowmobile which has an elongated, endless driving tread at the rear, the need has developed for an inexpensive wheel dolly of simple design and construction which may be readily attachable to each side of the snowmobile, and adapted when moved to a lifting position to lift the driving tread out of driving engagement with the ground. Accordingly, with the dollies in the lifting position, the tread of the snowmobile is supported above ground by the wheels on the dollies. This facilitates repair work by permitting the snowmobile to be readily pushed or moved around, and the engine started and the transmission moved into driving gear without resulting in any movement of the snowmobile. None of the prior-art dollies that applicant is aware of is suitable for such use with a snowmobile or the like.

SUMMARY OF THE INVENTION

This invention includes within its scope a wheel dolly for use in lifting one side of an object such as a snowmobile having a side panel with a peripheral rim. The dolly is of simple design and construction, and comprises a U-shaped support bracket having an object engaging member at one end movable into engagement with the lower and rear surfaces of the rim, and another object engaging member at the other end engageable with the front surface of the side panel. The support bracket rotatably supports a lever to which a wheel is secured at one end, and the lever is movable between a mounting position in which the support bracket may be readily manually attached to the side panel, and a lifting position in which the support bracket is releasably secured to the side panel by virtue of the weight of the object relative to the wheel, and the object is lifted above a reference surface such as the ground. The lever may be mounted relative to the support bracket in such a way that the weight of the object holds the lever in its lifting position, or for a positive locking action, a latch may be provided for holding the lever in its lifting position. The wheel may be secured to the lever for movement in a plane transverse to the support bracket, or when the dolly is mounted on an object for movement in a plane parallel to the side panel. In the alternative, the wheel may be mounted on the end of the lever for rotatable movement similar to a castor.

It is therefore an object of the present invention to provide an improved wheel dolly that is of simple design and construction, thoroughly reliable in operation, and economical to manufacture.

Another object of the invention is to provide a wheel dolly having means for moving the wheel between a mounting position in which the dolly may be readily manually attached to an object to be lifted, and a lifting position for substantially simultaneously releasably securing the dolly to the object and lifting the object.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawing, in which.

Figure 3:
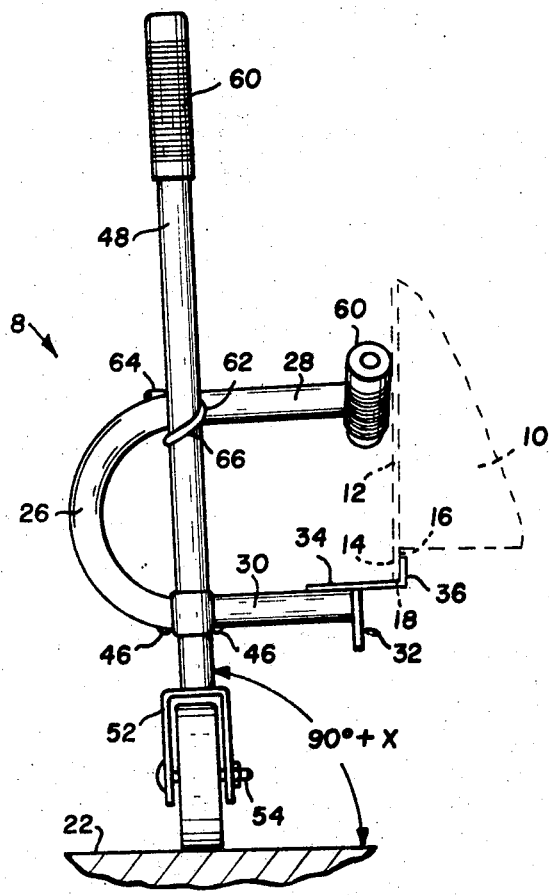
FIG. 3 is a side elevational view of the wheel dolly of FIG. 1.

DESCRIPTION OF THE PREFERRED EMBODIMENTS:

With reference to the drawings, the wheel dolly 8 of this invention is illustrated in connection with an object 10 to be lifted such as the rear end portion of a snowmobile. Although this wheel dolly 8 is designed specifically for lifting opposite sides of the rear end of a snowmobile, it may be used for lifting any object 10 having a side panel 12 as best seen in FIG. 3 provided with a peripheral rim 14 along one edge. The rim has rear and bottom surfaces 16, 18 respectively transverse to one another, the rear surface 16 further being substantially parallel to the front surface of side panel 12. The wheel dollies 8 provide a simple and facile way for lifting the sides of the rear end of a snowmobile for raising the driving tread 20 of the snowmobile out of engagement with a reference level such as the ground 22. By virtue of wheels 24 on the dollies, the snowmobile may be easily pushed around to facilitate repair work on the snowmobile and to permit operation of the engine with the transmission in a driving gear without resulting in any movement of the snowmobile.

Figure 4:
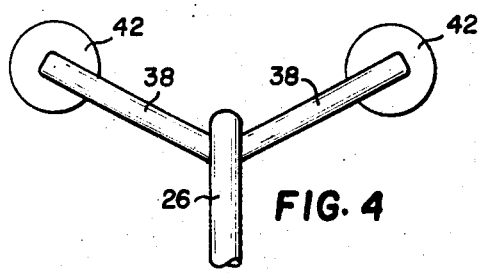
FIG. 4 is a segmental front elevational view of a modification of one end of the support bracket of the wheel dolly of FIG. 1.
Figure 5:
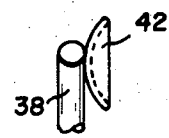
FIG. 5 is a segmental side elevational view of the structure of FIG. 4.

The wheel dolly 8 comprises a U-shaped support bracket 26 (see FIG. 3) formed from a metal tube or pipe which is bent into a substantially U-shaped form having upper and lower parallel arms 28, 30 respectively. Although a tubular material is preferred for this bracket, it can, of course, be made from any suitable bar stock or the like. The lower arm 30 of bracket 26 has an elongated flange 32 secured to the end thereof by welding or the like as best seen in FIG. 3. The flange has a flat portion 34 for engaging the lower surface or edge 18 of panel rim 14 when the dolly is attached to side panel 12, and a pair of spaced, upwardly extending lips 36 for engaging the rear surface 16 of rim 14. The end of upper arm 28 of bracket 26 is bifurcated, and the two free ends 38 thereof are provided with resilient cups 40 similar to the rubber cup-shaped tips provided for the ends of canes and chair legs, or the rubber grips provided on bicycle handlebars. In the alternative, as seen in FIGS. 4 and 5, the ends of the bifurcated portion 38 may be provided with resilient suction cups 42 for releasably engaging the surface of side panel 12 when the dolly 8 is attached thereto.

Figure 1:
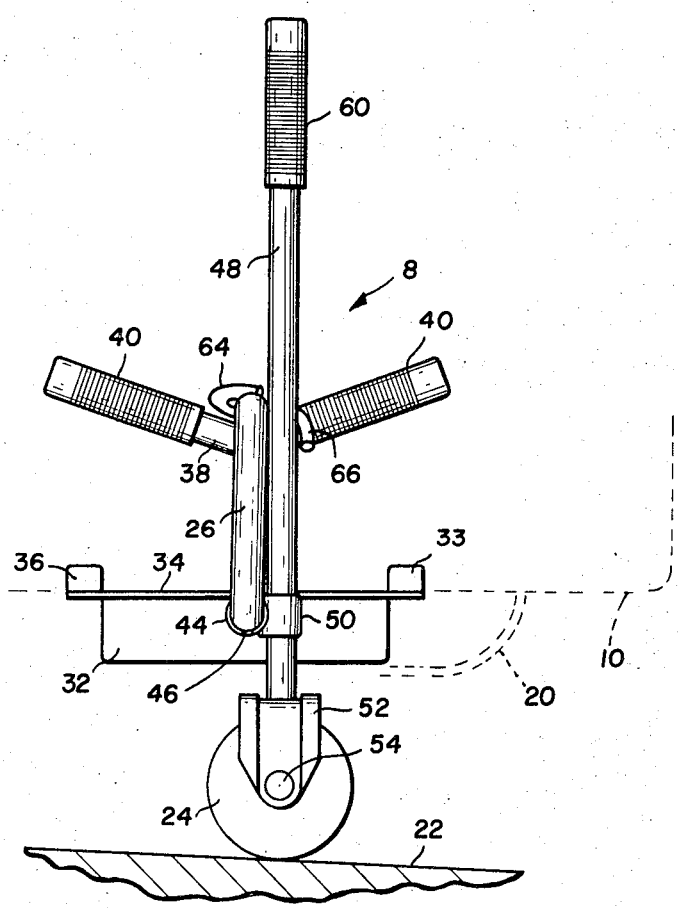
FIG. 1 is a front elevational view of the wheel dolly of this invention illustrated in a lifting position in connection with an object to be lifted such as the side of one end of a snowmobile.
Figure 2:
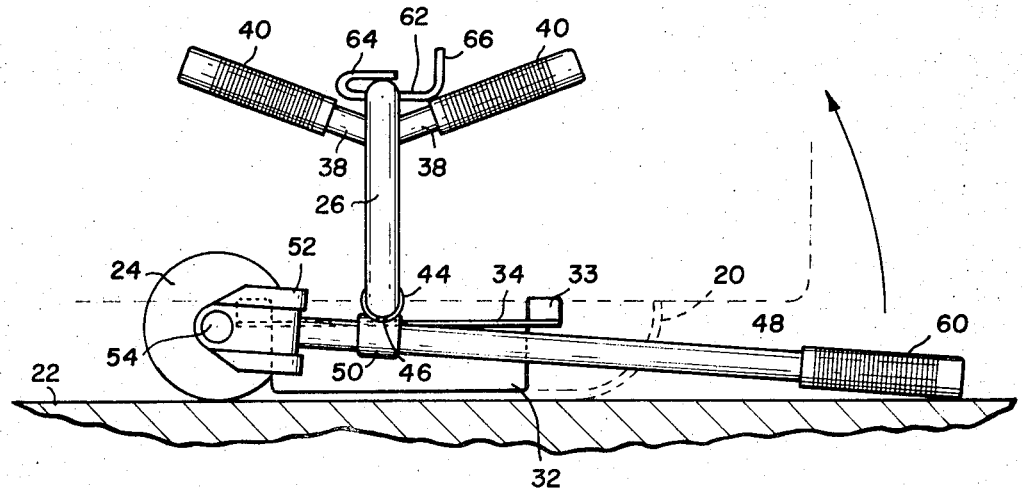
FIG. 2 is a front elevational view similar to FIG. 1 showing the wheel dolly in a mounting position in which it may be readily manually attached to the side panel of an object to be lifted.
Figure 6:
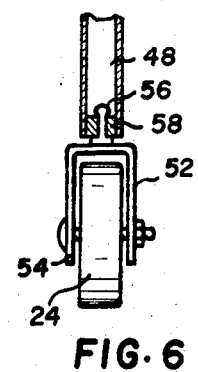
FIG. 6 is a segmental view showing a modification of the wheel mounting for the dolly.

In order to lift bracket 26 and side panel 12 of an object 10 to which it is usually attached, a sleeve 44 is rotatably mounted on lower arm 30 and retained in one axial position by spaced welds 46 (see FIG. 3). One side of sleeve 44 is secured to a tubular lever 48 by any suitable means such as a collar 50 rigidly secured to lever 48 or by welding or the like, and one end of lever 48 is provided with a U-shaped yoke 52 (see FIGS. 3 and 6) for rotatably supporting wheel 24 on an axle 54. The yoke 52 may be rigidly secured to lever 48 by welding with the plane of wheel 24 transverse to bracket 26 or substantially parallel to side panel 12 as seen in FIG. 3, or yoke 52 may be rotatably mounted on the end of lever 48 by forcing a ball headed pin 56 through a resilient collar 58 similar to a caster. The lever 48 and wheel 24 are movable by hand grip 60 on lever 48 between a mounting position seen in FIG. 2 in which wheel 24 does not interfere with manually attaching flange 32 of support bracket 26 to rim 14 of side panel 12, and a lifting position as seen in FIGS. 1 and 3 in which object 10 is lifted above the ground surface 22 by virtue of the fact that the distance between the axis of the lower arm 30 and the outermost surface of wheel 24 is greater than the distance between bottom 18 of rim 14 and the ground surface 22. As object 10 is being lifted, the weight thereof bears against portion 34 and lip 36 of flange 32 tending to move the dolly 8 in a clockwise direction as denoted by an arrow in FIG. 3 around the bottom of wheel 24 as a pivot for forcibly urging the bifurcated ends 38 of upper arm 28 into engagement with the front surface of side panel 12. Accordingly, initial movement of lever 48 and wheel 24 toward the lifting position releasably secures the support bracket 26 to side panel 12, and continued movement of lever 48 lifts the object from the ground 22. The lever 48 and wheel 24 may be positively held in the fixed position by a substantially S-shaped latch 62 comprising an intermediate portion rotatably mounted within a bore hole in arm 28, one end 64 for moving latch 62 between latched and unlatched positions, and its opposite end 66 forming a hook movable around wheel lever 48 when it is in its lifting position as seen in FIGS. 1 and 3. It is possible that the S-shaped latch 62 may be eliminated if an arm, not shown, is interposed between sleeve 44 and collar 50 for increasing the distance between sleeve 44 and lever 48 so that in the lifting position of the lever, wheel 24 will be positioned on one side of the plane in which support bracket 26 is located, and hence the weight of the object 10 acting on wheel 24 will move lever 48 in a counterclockwise direction as seen in FIG. 1 causing the upper end of lever 48 to be forced into firm engagement with upper arm 28.

The invention has been described in detail with particular reference to a preferred embodiment thereof, but it will be understood that variations and modifications can be effected within the spirit and scope of the invention as described hereinabove.

I claim:
1. In a wheel dolly for lifting an object, the combination comprising:
   a lever rotatably supporting a wheel at one end; and a support bracket lying in a first plane for rotatably supporting said lever intermediate its ends for movement in a second plane transverse to the first plane;
   said support bracket having a first portion for engaging two surfaces on the object that are transverse to one another, and a second portion spaced from said first portion for engaging a third surface on the object.
2. The invention according to claim 1 wherein said first portion comprises a flange having a transversely extending lip, and said second portion is bifurcated.
3. The invention according to claim 2 wherein said bifurcated second portion is provided with resilient cups on the ends thereof for engaging the third surface.
4. The invention according to claim 2 wherein said bifurcated portion is provided with resilient suction cups at the ends thereof for engaging the third surface.
5. The invention according to claim 1 wherein said support bracket comprises a pair of spaced, parallel arms, one of said arms rotatably supporting said lever, and said first portion is mounted to the end of one of said arms and comprises a flange having a transversely extending lip, and said second portion is mounted to the end of said other of said arms and is bifurcated.
6. The invention according to claim 5 wherein said one arm has a sleeve rotatably mounted thereon, and a collar secured to said sleeve for adjustably supporting said lever.
7. The invention according to claim 1 wherein said lever has a sleeve adjustably secured thereto intermediate its end, said support bracket comprises a tubular member bent into a U-shape to form first and second spaced, parallel arms, said first arm rotatably supporting said sleeve, and said second arm forming a stop for said lever, said first portion being mounted at the end of said first arm, and a second portion being mounted at the end of said second arm.
8. In a wheel dolly for lifting above a reference level an object having a side panel and a lower rim having rear and bottom surfaces transverse to one another with the rear surface substantially parallel to the side panel, the combination comprising:
   a lever for rotatably supporting a wheel at one end thereof; and
   means including a pivot for pivotally supporting said lever intermediate its ends for pivotal movement in one plane between a mounting position, in which said lever and wheel are substantially in a horizontal position and extend a distance below said pivot that is less than the distance between the bottom surface and the reference level to facilitate mounting said dolly to the object, and a lifting position in which said lever and wheel are substantially in a vertical position and the wheel extends below said pivot a distance greater than the distance between the bottom surface and the reference level for lifting the object;
   said lever-supporting means having spaced-apart first and second object engaging means, said first object engaging means adapted to engage the rear and bottom surfaces of the object and to be moved in one direction by the weight of the object when said lever is moved to its lifting position causing said second object engaging means to be forced in the same direction into engagement with the side panel of the object for releasably holding the dolly onto the object.

9. The invention according to claim 8 wherein said first object engaging means comprises a flange having a flat portion for engaging the bottom surface, and further having an upturned lip at the end of said flange for engaging the rear surface, and said second object engaging means is bifurcated.

10. The invention according to claim 9 wherein said bifurcated second object engaging means is provided with resilient cups on the ends thereof for engaging the side panel of the object.

11. The invention according to claim 10 wherein said bifurcated second object engaging means is provided with resilient suction cups at the ends thereof for engaging the side panel of the object.

12. The invention according to claim 8 wherein said lever supporting means comprises a tubular member bent into a U-shape to form first and second spaced, parallel arms, said first object engaging means being mounted on the end of said first arm and comprising a flange having a flat portion for engaging the bottom surface of the rim and an upturned lip at the end of said flange for engaging the rear surface of the rim, said second object engaging means being mounted on the end of said second arm and is bifurcated, and said pivot comprises a portion of said second arm about which a sleeve is rotatably mounted, said sleeve being adjustably secured to said lever.

* * * * *